United States Patent [19]

Grayson et al.

[11] Patent Number: 5,111,531

[45] Date of Patent: May 5, 1992

[54] PROCESS CONTROL USING NEURAL NETWORK

[75] Inventors: S. Keith Grayson; John B. Rudd, both of Mobile, Ala.

[73] Assignee: Automation Technology, Inc., Mobile, Ala.

[21] Appl. No.: 462,503

[22] Filed: Jan. 8, 1990

[51] Int. Cl.$^5$ ............................................. G05B 13/00
[52] U.S. Cl. ....................... 395/23; 395/24; 364/162
[58] Field of Search ...................... 364/513; 395/23, 24

[56] References Cited

U.S. PATENT DOCUMENTS

| | | | |
|---|---|---|---|
| 4,193,115 | 3/1980 | Albus | 364/513 |
| 4,777,960 | 10/1988 | Berger et al. | 364/413.03 |
| 4,858,147 | 8/1989 | Conwell | 364/200 |
| 4,893,255 | 1/1990 | Tomlinson, Jr. | 364/807 |
| 4,903,192 | 2/1990 | Saito et al. | 364/162 |
| 4,912,653 | 3/1990 | Wood | 364/513 |

OTHER PUBLICATIONS

"Connectionest Expert System", Communication of the ACM, Stephen I. Gallant, vol. 31, No. 2, Feb. 1986.
"Application of Neural Network to the Manufacturing Environment", H. J. Caulfield, SPIE, vol. 954 Optical Testing and Metrology II (1988).
"Automatic Chemical Process Control Using Reinforcement Learning in Artificial Neural Networks", J. C. Hoskins and D. M. Himmelblau, Dept. of Chemical Eng., University of Texas at Austin, 1988.
"Application of Neural Networks to the Manufacturing Environment", H. J. Caulfield, Center for Applied Optics, University of Alabama in Huntsville, pp. 464-467, 1988.
"A Multilayered Neural Network Controller", D. Psaltis, A. Sideris and A. A. Yamamura, IEEE Contr. Syst. Mag., Apr. 1988, pp. 17-21.
"Neuronlike Adaptive Elements That Can Solve Difficult Learning Control Problems", IEEE Trans. Syst. Man., Cybern-1, Sep./Oct. 1983, pp. 834-846.
"Neural Networks, Part 1: What are they and why is everybody so interested in them now?", P. D. Wasserman and T. Schwartz, IEEE Expert, Winter 1987, pp. 10-14.
"Neural Networks, Part 2: What are they and why is everybody so interested in them now?", P. D. Wasserman, T. Schwartz, IEEE Expert, Spring 1988, pp. 10-15.
"An Associative Memory Based Learning Control Scheme with PI-Controller for SISO-Nonlinear Processes", E. Ersu and S. Wienand, IFAC Microcomputer Application in Process Control (1986), pp. 99-105.
"A Symbolic-Neural Method for Solving Control Problems", S. C. Suddarth, S. A. Sutton and A. D. C. Holden, IEEE International Conference on Neural Networks, vol. 1 (1988), pp. I-516-I-523.
"Use of Neural Nets for Dynamic Modeling and Control of Chemical Process Systems", Naveen Bhat and Thomas J. McAvoy, Proceedings of the 1989 American Control Conference, Jun. 21-23, 1989, pp. 1342-1347.

*Primary Examiner*—Michael R. Fleming
*Assistant Examiner*—George Davis

[57] ABSTRACT

A control system and method for a continuous process in which a trained neural network predicts the value of an indirectly controlled process variable and the values of directly controlled process variables are changed to cause the predicted value to approach a desired value.

31 Claims, 12 Drawing Sheets

PROCESS CONTROL USING NEURAL NETWORK

BACKGROUND AND DISCUSSION OF PRIOR ART

This invention relates to new and useful improvements to the control of complex multi-variable continuous manufacturing processes. More specifically, the invention relates to the use of techniques to develop, implement and use a neural network to dynamically monitor and adjust a manufacturing process to attain a product that, for example, meets optimum quality and production requirements.

Process optimization contemplates a wide variety of situations where there is a need to control variables that are not directly or instantaneously controllable. In these situations, the only mechanism (PVs) for control is the manipulation of variables but not a way that can be easily determined mathematically. A human process expert can empirically derive an algorithm to optimize the indirectly controlled variables; however, as the number of PVs that influence the indirectly controlled variables increase, the complexity of the problem grows by the square of the increase. Since this condition quickly becomes unmanageable, the PVs with less influence are ignored in the solution. Although each of these PVs exhibit low influence when considered alone, the cumulative effect of multiple PVs can have significant influence. Their omission from the optimization algorithm can greatly reduce its accuracy and usability.

FIG. 1 illustrates the typical problem. The physical process block represents any complex multi-variable continuous process where several process variables are controlled to produce optimized outputs. The individual PVs are controlled by independent proportional-integral-derivative (PID) controllers in a conventional closed loop strategy. Process variables that cannot be controlled directly or immediately are labeled PV'1, PV'2.

The setpoint(s) (SP) of each of these PID loops is determined by the controller which may simply be a process expert (foreman, process engineer, etc.) to produce the desired outputs from the physical process for the current conditions. If the outputs deviate from the optimum, the process expert decides which setpoint(s) should be adjusted and the amount of the adjustments. In many processes, there may be a significant lag time between corrective action taken and the results of that action. This lag time is not caused by the response time of the individual PID loops, but is a result of the natural time constant of the physical process. PID loops normally respond rapidly when compared to the total process time constant.

There are problems with trying to optimize this type of process because of the process time constants and shifts in the steady state domain of the process. The corrections to these problems are not easily determined mathematically. It requires the experience of a process expert to derive the corrective actions.

Efforts to overcome and develop optimum solutions to the above problems have varied. In the simplest case multi-variable linear regression has been used to develope correlation equations. In more complex applications, actual mathematical models have been developed to approximate the process so that results are projected and changes to the SPs are made without having to wait for the process to respond with its normal time cycle. In the most recent efforts, the experiences of the process experts have been reduced to a set of rules that are implemented in a computer and/or microprocessor to change the SPs. A rule based expert system "quantifies" human intelligence, building a database of rules, derived from one or multiple experts, to govern what to do when predefined measurable situations arise.

This prior art has shortcomings: 1) known mathematical relationships between the process variables being considered may not exist; 2) assumptions must be made to reduce the relationships between the process variables to a domain that can be mathematically modeled; and 3) expert rules cannot be derived because experts do not exist or multiple experts do exist and their opinions differ.

Neural networks or neural nets are, as the name implies, networks of neurons (elements) that interconnect in a unique way. Typically, the networks comprise input neurons that receive signals or information from outside the network, output neurons that transmit signals or information outside the network and at least one hidden layer of neurons that receive and pass along information to other neurons. The potential advantage of neural nets is that, unlike classification logic, they can work with less than perfect input information. See "Neural Networks Part, 1", *IEEE Expert*, Winter 1987 and "Neural Networks Part, 2", *IEEE Expert* Spring 1988. The application of neural networks to commercial applications has not been reported. Two theoretical articles found by applicants relate to very simple or simulated use of neural networks for control. "An Associative Memory Based Learning Control Scheme With PI-Controller For SISO-Nonlinear Processes", Ersu and Wienand *IFAC Microcomputer Application in Process Control* (1986) and "A Symbolic-Neural Method for Solving Control Problems", Suddarth, Sutton and Holden, *IEEE International Conference on Neural Networks*, Vol. 1 (1988).

Recently, software for emulating neural networks on personal size computers has become commercially available. One such program sold under the Trademark "NeuroShell" is described in the accompanying user manual "NeuroShell Neural Network Shell Program", Ward Systems Group, Inc., Frederick, MD 21701 (1988). This manual is incorporated herein by reference.

It is an advantage, according to this invention, to use the existing neural network technology, either hardware or software, in a user configurable system for process optimization.

SUMMARY OF THE INVENTION

Briefly, according to this invention, there is provided a control system for a multi-variable process wherein certain process variables may only be controlled indirectly by control of a plurality of directly controllable process variables. The system comprises fast-acting controllable devices for changing controllable process variables, a neural network for predicting the value of at least one indirectly controlled variable, and computer means for storing and executing rules that determine the input values for the neural network and the application of the output values of the neural network as set points for the fast-acting devices. The control system is so constructed and arranged that after the neural network has been trained to predict the state of the indirectly controlled variables, a rule associated with an output neuron changes at least one set point value to cause the difference between the predicted value of the indirectly controlled variable to approach the desired value of the indirectly controlled variable.

The fast-acting devices, for example, motors connected to valves or power supplies controlling electrical heating currents, establish the value of the variable at a set point value applied to said fast-acting device. Preferably, the fast-acting devices include active elements, for example, motors with feedback controllers that compare the values of the directly controllable variables with the set point values and generate error signals which when applied to the active elements drive the active elements to diminish the error signals. Most preferably, the feedback controllers are PID controllers.

The trainable neural networks have a plurality of input neurons for having input values applied thereto and at least one output neuron for outputting an output value. The neural network may be implemented as an integrated circuit defining the neural network including circuitry for implementing a teaching algorithm, for example, a back propagation teaching algorithm, or as a computer program defining the neural network and a teaching algorithm.

A computer memory stores an input value for input neurons and at least one computer executable rule associated with an input neuron to establish the input value. The memory also stores an output value for output neurons and at least one computer executable rule for an output neuron. Preferably, the computer memory stores values and rules associated with each input neuron and values and rules associated with each output neuron in a computer database.

A computer having a computer memory maintains a process description database defining the state of the multi-variable process including the instantaneous values of the process variables. Data input means, for example, direct I/O connection to process variable measurement means or a terminal keyboard or a connection to a host computer, enables entering the desired value of at least one indirectly controlled variable into the process database. Hardware and associated computer tasks are provided for continuously updating the process database to reflect the values of the directly controllable variables. Preferably, computer input ports and a computer task for polling the ports or fielding interrupts from the ports transfers process variable values from the ports to the process database.

A computer is programed for executing the rules associated with each input neuron to establish the value of the input neuron and for executing the rules associated with the output neurons for establishing the set point values to be applied to the fast-acting means. Preferably, the computer executes the rules with an evaluator task which loads the rules and loads the values, if any, required to evaluate the rules from the process database and/or the input neurons and/or the output neurons and evaluates the rules one at a time.

Circuitry and a computer task are provided for applying the set point values to the fast-acting devices. Preferably, the circuitry comprises computer output ports and a computer task for transferring the set point values to the output ports.

A computer task is provided for training the neural network to predict a value corresponding to the value of at least one indirectly controllable variable at an output neuron from the values at input neurons corresponding to directly controllable variables. The task for training the neural network comprises presenting a plurality of training sets of input neuron and output neuron values captured from the process while it is in operation to the neural network during a training period in which a back propagation algorithm adjusts the interconnections between neurons. According to one embodiment, at least one input neuron value and at least one output neuron value are captured at different times.

According to a preferred embodiment, values of variables are stored at spaced time intervals to maintain a process history, for example, in a first-in-first-out buffer. Most preferably, the process history is part of the process database and the rules associated with at least one input neuron take as a parameter a value from the process history.

The rules associated with input neurons may comprise averaging, filtering, combining and/or switching rules. The rules associated with output neurons may comprise limit checking, weighing, scaling and/or rationing rules. The rules associated with at least one output neuron comprise rules for selecting which set points should be modified in order to move the predicted value to the desired value.

According to a preferred embodiment, a computer task stores the values of controllable variables in a first-in-first-out buffer immediately following a settling period in which the rules associated with the input and output neurons are continuously updated to move the predicted value to the desired value. In this way, a process history is maintained by the first-in-first-out buffer. The rules associated with at least one input neuron take as a parameter a value from the process history. This embodiment is useful where the actual value of the indirectly controlled process variable cannot be determined until some period after it has been predicted, for example, where the indirectly controllable variable is only determinable at a later time downstream from the fast-acting devices which control variables which may be used to alter the value of the indirectly controllable variable. In this embodiment, training comprises presenting to the neural network a plurality of training sets of input neuron and output neuron values captured from the process at different times.

BRIEF DESCRIPTION OF THE DRAWINGS

Further features and other objects and advantages will become clear to those of ordinary skill in the art from the following description made with reference to the drawings in which.

DESCRIPTION OF THE PREFERRED EMBODIMENTS

Figure 1:
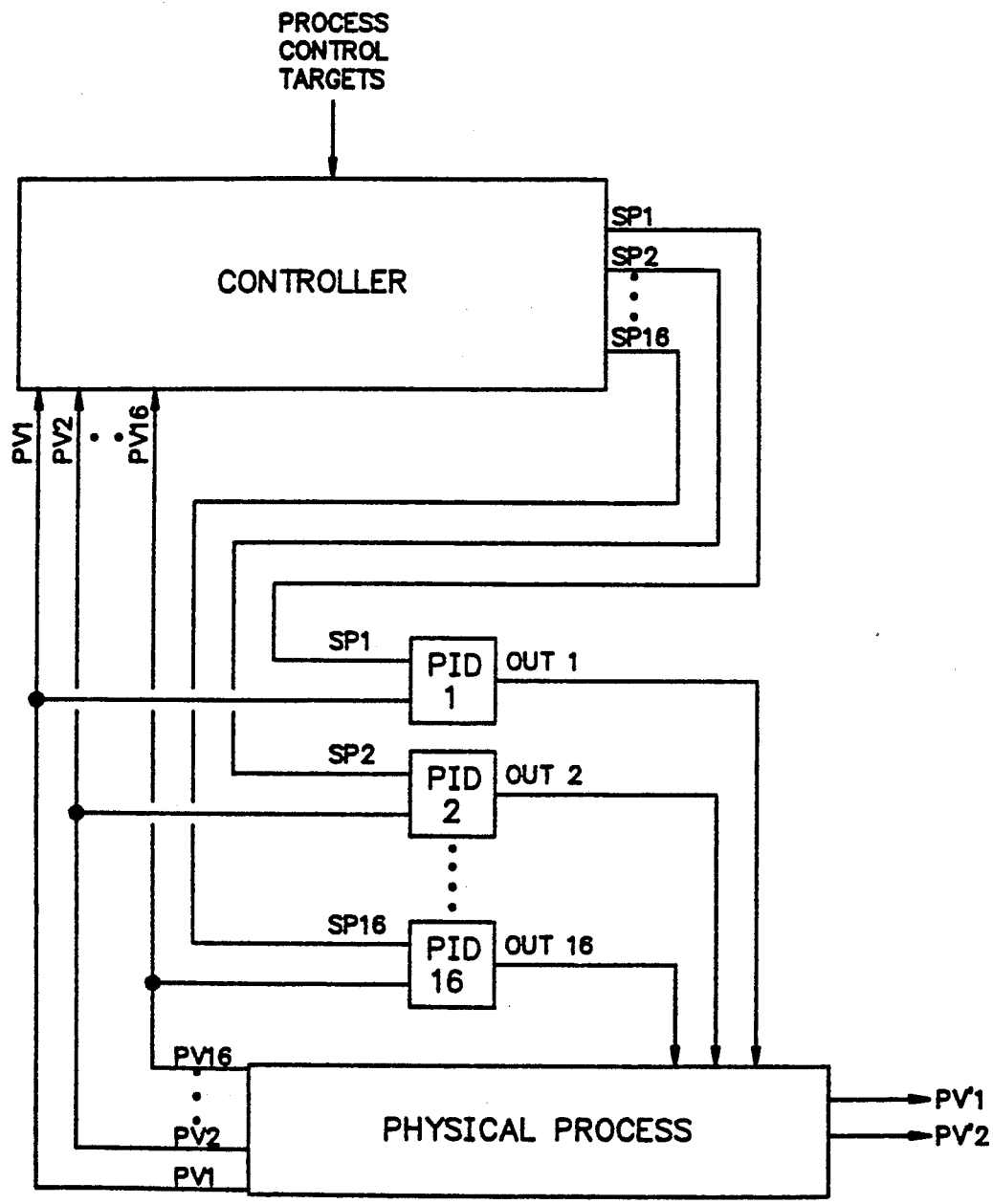
FIG. 1 illustrates the arrangement of a process control system for a complex multi-variable process.
Figure 2:
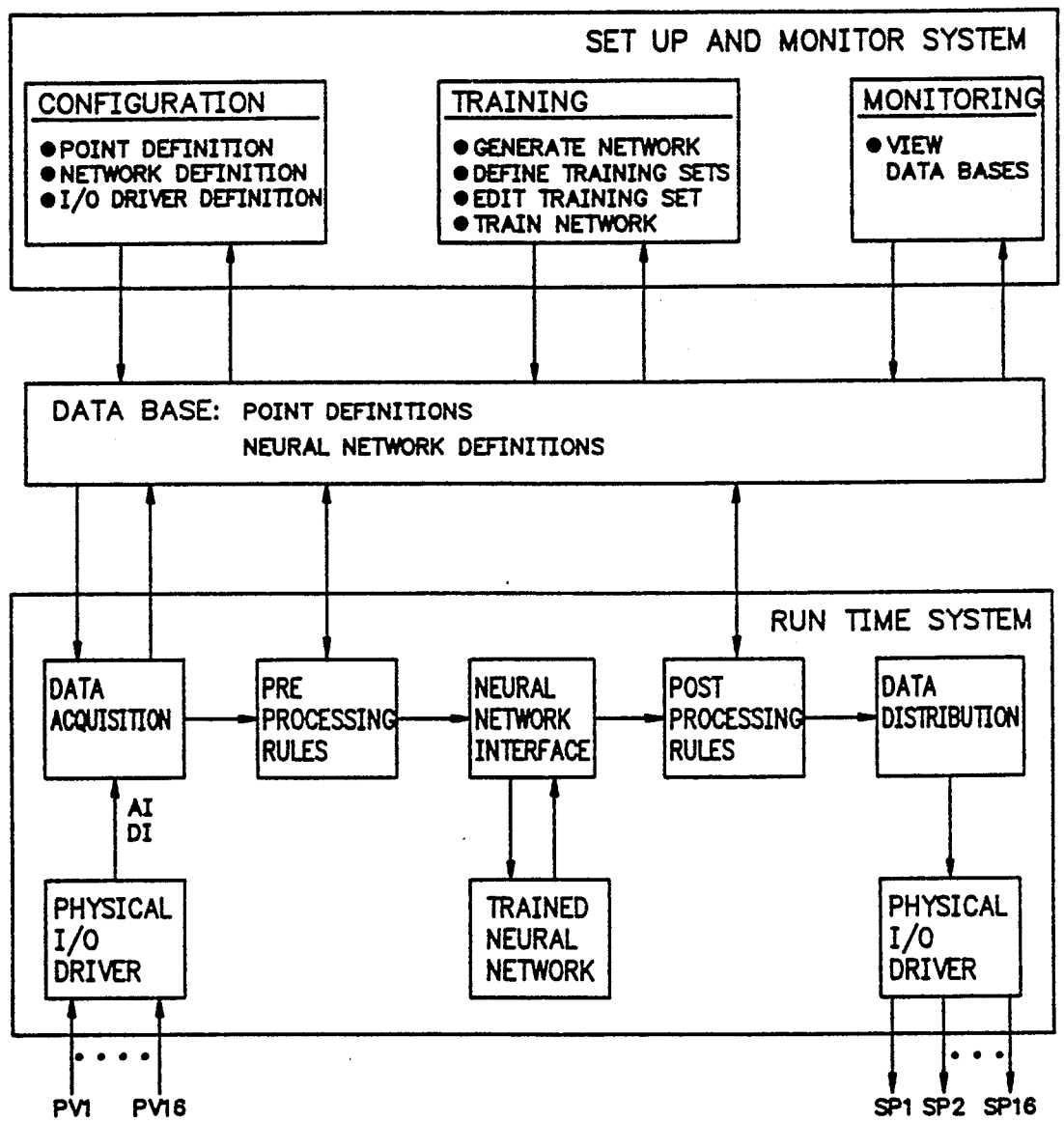
FIG. 2 illustrates the overall structure of the neural optimization controller as a block diagram.

According to this invention, the multi-variable processing system as shown in FIG. 1 is provided with the unique control system illustrated in block diagram form in FIG. 2. Referring to FIG. 2, a database is first defined and customized for each specific process application. This is done through three computer software implemented functions requiring operator interaction through the console monitor and keyboard; namely, configuration, neural network training, and monitoring of the system. During configuration, the user enters all of the information necessary to define the physical inputs and outputs, the input processing rules and the output processing rules, the training database and protocol to communicate with all foreign devices. The database configuration tools, data acquisition, rules and rule processing, training networks and monitoring may be distributed among separate systems, for example, process control, neural network controller system, and host computer, with communication software provided for transferring data between systems as required. In an alternative embodiment, the tasks reside in and are part of a stand-alone multi-tasking operating system.

Through the training function, the user is able to train the neural network. Data points are specified that are to be included in the database, screens are created for the operator to view while the system is running, and this information is compiled. With the train neural network function, the data is added to the training set where current data is edited. Once the data is in the desired form, the system is directed to use the data to develop a trained network.

The trained neural network is then used in the run time system. The run time system provides for automatically collecting data to update the training set and to re-train the network.

This invention is based upon the application of neural network technology which is a tool that attempts to classify patterns according to other patterns that have been "learned" previously and gives the most reasonable answers based upon the variety of learned patterns. It is not guaranteed to always be correct and its results must be evaluated in terms of the percentage of answers that match those an expert might give. In this regard, the technology is similar to the biological neural functions that it simulates and is significantly different from other conventional software systems.

The basic building block of the neural network technology is the simulated neuron which processes a number of inputs to produce an output. Inputs and outputs are usually numeric values between 0 and 1, where values close to 1 represent positive stimulation, and 0 represents either negative or no stimulation. Inputs to the neuron may come from the "outside world" or from other neurons, and outputs may go to other neurons or to the "outside world". The process used by the neuron to process its inputs is usually a summation of inputs followed by a linear function applied to the sum called an output function.

Independent neurons are of little value by themselves, however, when interconnected in a network and "trained" the resulting network becomes a useful tool. Neurons, also called nodes, in the first layer receive their inputs from the outside and are called input nodes and neurons in the output layer send their outputs to the outside and are called output nodes. Each of the input nodes indirectly passes its output to each of the ouput nodes for final processing. As the values are passed, they are weighted to represent connection strengths. To positively reinforce a connection, the weight is raised and to negatively reinforce or inhibit a connection the weight is lowered. The determination of the weighting factors takes place in the training process.

Training is the process where inputs with a known result are supplied to the network and the errors between the predicted results and the known results are used to adjust the weights. This process is repeated until the error is reduced to an acceptable tolerance. Upon completion of training, the network should be capable of reproducing correct output patterns when presented with input patterns similar to those learned.

A two-layer network is not capable of learning complex patterns, for example, the exclusive OR pattern. However, by adding additional layers and using a training technique referred to as back propagation, this deficiency is overcome. The nodes in a layer between the input and output nodes are called hidden nodes. The theory behind back propagation learning is referred to as the generalized Delta Rule and is detailed in Rumelhart and McClelland "Parallel Distributed Processing", Vol. 1, pp. 444-459.

The operational details of the actual neural network software program evaluated and used in the present described embodiments can be found in the referenced operating manual "NeuroShell Neural Network Shell Program."

Referring again to FIG. 2, there is shown a block diagram of the system according to this invention for controlling a physical multi-variable manufacturing process. The entire system has been implemented using a combination of hardware and software to accomplish the functions represented by the blocks labeled "Configuration", "Training", "Monitoring" and "Run Time" System. The configuration function allows the user to define the specific process application. The training function allows the user to automatically generate neural networks based upon the configuration information and train the network based upon the training data collected. The monitoring function allows the user to view process data and neural network outputs. The run time function uses a previously trained neural network to implement real time control of the process based upon the user configuration. Each of these functions is described in further detail below. The descriptions are based on an embodiment utilizing Ashton Tate's dBASE IV programming language and the NeuroShell neural network emulation program. The dBASE IV source code for the computer implementation is set forth in the microfiche appendix filed herewith.

The configuration function allows the user to build databases that define the physical process points, the network configuration and the I/O driver protocols. Physical process points are defined by assigning a tagname, description, unit of measurement and range of values for each point to be used by the system. These points include physical inputs, calculated values, manually entered values and physical outputs. The definition of each point is stored in the database named POINT-DEF.DBF. The entries for an exemplary process definition database are set forth in Table I.

TABLE 1

| TAGNAME | DESCRIPT | VALUE | UNITS | MODE |
|---|---|---|---|---|
| MI101 | Production Rate | 600.0000 | TONS/DAY | CAL |
| FI102 | Stock Flow to Bleach Plt | 3216.0000 | GPM | AI |
| CI103A | Stock Consistency | 2.8780 | % | AI |
| FI104 | Injection Water Flow | 540.0000 | GPM | AI |
| FI105 | ClO2 Total Flow | 62.0000 | GPM | AI |
| FI106 | Clean Shower Flow | 560.0000 | GPM | AI |
| TI107 | Clean Shower Temperature | 152.0000 | Degrees | AI |
| FI108 | NaOH Shower Flow | 120.0000 | GPM | AI |
| TI109 | NaOH Shower Temperature | 150.0000 | Degrees | AI |
| TI110 | Vat Temperature | 142.0000 | Degrees | AI |
| LI111 | Vat Level | 73.0000 | % FULL | AI |
| ZI112 | Vat Dilution Valve Pos. | 34.0000 | % OPEN | AI |
| CI113 | Predicted Vat Consist. | 1.0000 | % | NO |
| CI114 | Predicted Mat Consist. | 120.0000 | % | NO |
| CI103 | Sel Stock Consistency | 2.5000 | % | CAL |
| CI103B | Stock Consistency | 2.5000 | % | AI |
| GRADE | Pine/Hardwood | 1.0000 | PINE/HDW | DI |
| BI115 | C-Stage Brightness | 24.5000 | CEK | AI |
| RI116 | C-Stage Residual | 0.0500 | % | AI |
| FI117 | Chlorine Flow | 2300.0000 | lb/hr | AI |
| MI117 | Percent Applied Chlorine | 6.2000 | % | CAL |
| FI118 | Caustic Flow | 65.0000 | GPM | AI |
| MI118 | Percent Applied Caustic | 3.5000 | % | CAL |
| FR117 | CL2/CLO2 Substitution | 0.3000 | | MAN |
| DI105 | CLO2 Concentration | 8.0000 | GPL | MAN |
| DI118 | NaOH Concentration | 7.2000 | GPL | MAN |
| TI119 | Chlorine Gas Temp. | 156.0000 | Degrees | AI |
| PI120 | Chlorine Gas Pressure | 112.0000 | psig | AI |
| TI121 | Stock Temp. Entering BP | 115.0000 | Degrees | AI |
| MI122 | Mass Rate to Cl2 Washer | 600.0000 | TONS/DAY | CAL |
| FI123 | Flow Out of Cl2 Washer | 825.0000 | GPM | CAL |
| CI124 | Stk Consist. Cl2 Wash Ot | 12.2000 | % | CAL |
| MI125 | Mass Rate from Cl2 Wash | 575.0000 | TONS/DAY | CAL |
| TI126 | Oxygen Gas Temperature | 125.0000 | Degrees | AI |
| PI127 | Oxygen Gas Pressure | 100.0000 | psig | AI |
| FI128 | E-Stage Shower Flow | 825.0000 | GPM | AI |
| TI129 | E-Stage Shower Temp. | 165.0000 | Degrees | AI |
| TI130 | E-Stage Vat Temperature | 160.0000 | Degrees | AI |
| LI131 | E-Stage Vat Level | 75.0000 | % FULL | AI |
| ZI132 | E-Stage Dil. Valve Pos. | 80.0000 | % OPEN | AI |
| CI133 | E-Stage Vat Consistency | 1.2000 | % | NO |
| CI134 | E-Stage Mat Consistency | 11.5000 | % | NO |
| LI135 | E-Stage Tower Level | 75.0000 | % FULL | AI |
| MI136 | Mass Rate to E-Washer | 580.0000 | TONS/DAY | CAL |
| BI115B | CEK Lab Entry Value | 19.0000 | CEK | MAN |
| BI115A | Compensated CEK No. | 18.2000 | CEK | CAL |
| AI133 | E-Stage Entry pH | 10.5000 | pH | AI |
| FI134 | Oxygen Flow | 4800.0000 | PPH | AI |
| MI134 | Percent Applied Oxygen | 8.1000 | % | CAL |

Figure 11:
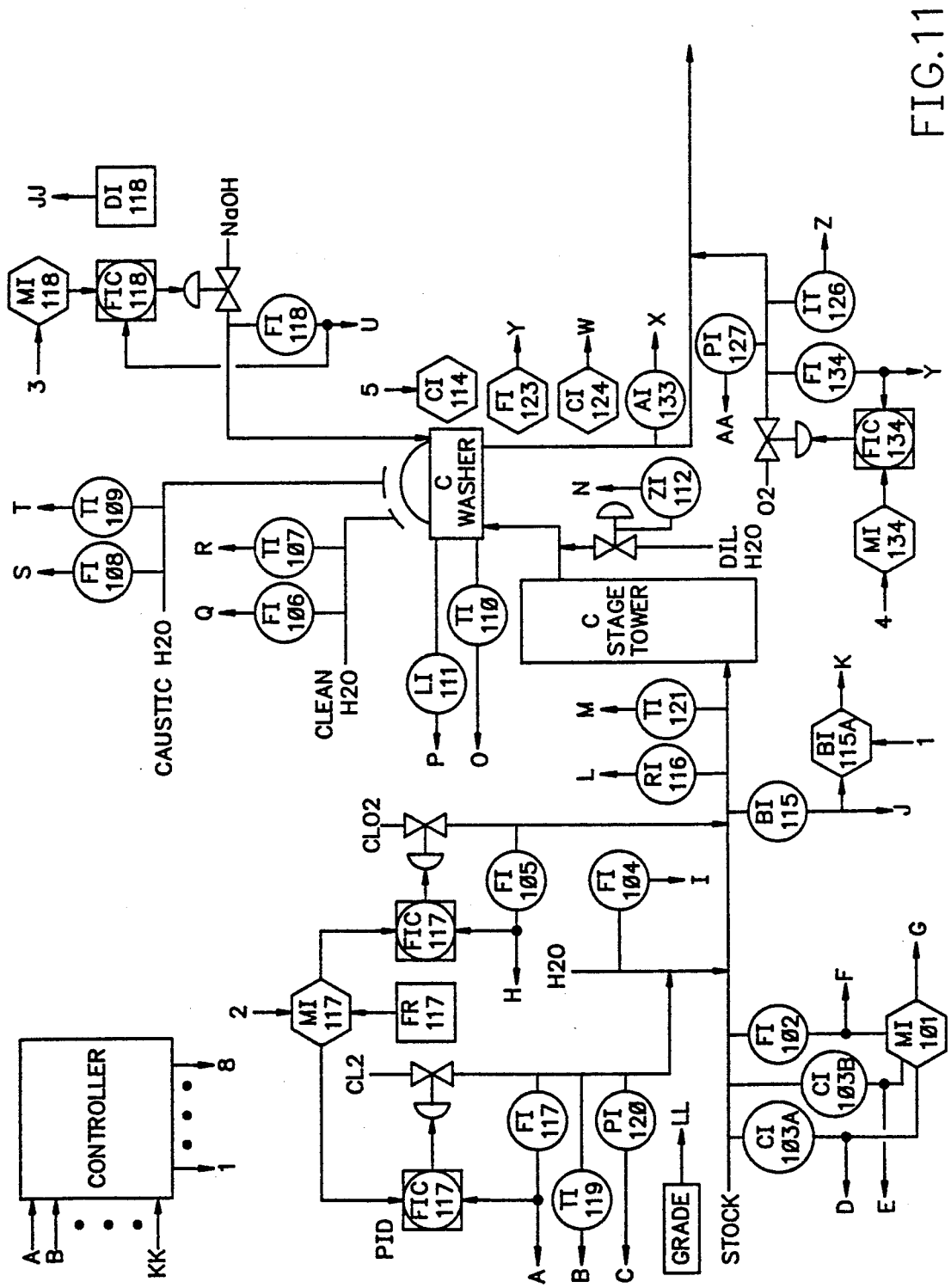
FIGS. 11 and 11A are schematics illustrating the equipment for a continuous bleaching process with process inputs numbered and process variables lettered.
Figure 11A:
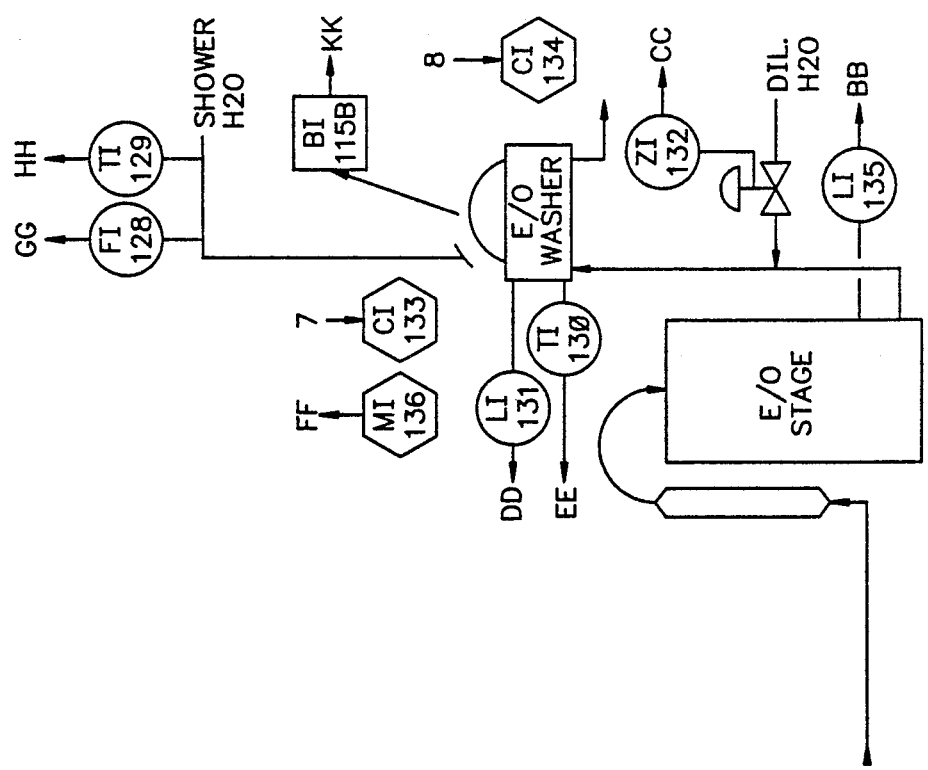

The process defined in Table 1 corresponds to the pulp bleaching process shown schematically in FIGS. 11 and 11A. The tagnames in the table correspond with the inputs and outputs labeled on FIG. 11. The entries in the column headed "Value" contain values for the variable identified by tagname in the left-most column. Variable values, of course, may be changed during processing. The entry in the column headed "Mode" indicates the type of input or output as follows: "AI" means analog input, "MAN" means manual input, "CAL" means manually or automatically calculated value and "NO" means neural net output.

The neural network is defined by assigning a tagname, description, units of measurement and range of values for each input and output neuron required. Processing rules are also defined for each neuron. Processing rules for input neurons are executed prior to submitting the input values to the trained network and are therefore referred to as "pre-processing" rules. Processing rules associated with output neurons are executed after obtaining the output values from the trained network and are referred to as "post-processing" rules. The definition of each neuron and its associated processing rules are stored in the database named NETDEF.DBF. The entries in an exemplary neural network database are set forth in Table II with the exception of the rules.

TABLE II

| NEURON | TAGNAME | DESCRIPT | VALUE | UNITS |
|---|---|---|---|---|
| INPUT01 | NI101 | Production Rate | 600.0000 | TONS/DAY |
| INPUT02 | NI102 | Stock Flow to Bleach Plt | 3216.0000 | GPM |
| INPUT03 | NI103 | Stock Consistency | 2.8780 | % |
| INPUT04 | NI104 | Injection Water Flow | 540.0000 | GPM |
| INPUT05 | NI105 | ClO2 Total Flow | 62.0000 | GPM |
| INPUT06 | NI106 | Clean Shower Flow | 560.0000 | GPM |
| INPUT07 | NI107 | Clean Shower Temperature | 152.0000 | Degrees |
| INPUT08 | NI108 | NaOH Shower Flow | 120.0000 | GPM |
| INPUT09 | NI109 | NaOH Shower Temperature | 150.0000 | Degrees |

TABLE II-continued

| NEURON | TAGNAME | DESCRIPT | VALUE | UNITS |
|---|---|---|---|---|
| INPUT10 | NI110 | Vat Temperature | 142.0000 | Degrees |
| INPUT11 | NI111 | Vat Level | 73.0000 | % Full |
| INPUT12 | NI112 | Vat Dilution Valve Posit | 34.0000 | % Open |
| INPUT13 | NI113 | Pine/Hardwood | 0.0000 | PINE/HDW |
| INPUT14 | NI114 | Chlorine Flow | 2300.0000 | lb/hr |
| INPUT15 | NI115 | Caustic Flow | 65.0000 | GPM |
| OUTPUT01 | NO101 | Predicted Mat Consist. | 13.2683 | % |
| OUTPUT02 | NO102 | Vat Consistency | 1.4852 | % |
| OUTPUT03 | NI103 | Equivalent C12 Set Point | 6.0000 | % on stk |
| OUTPUT04 | NO104 | Applied Caustic Target | 3.4000 | % on stk |

Exemplary rules for input neurons are set forth in Tables III-VIII.

TABLE III

| Neuron | INPUT06 | Tagname NI106 | Description Clean Shower Flow |
|---|---|---|---|
| Units | GPM | Value 560.0000 | Min 300.0000   Max 700.0000 |

Processing Instructions

NI106 = FI106

TABLE IV

| Neuron | INPUT01 | Tagname NI101 | Description Production Rate |
|---|---|---|---|
| Units | TONS/DAY | Value 600.0000 | Min 400.0000   Max 1000.0000 |

Processing Instructions

MI101 = 0.06 * NI102 * NI103      ** Calc Mass f (flw, con)
NI101 = NI101 + 0.40 * (MI101 − NI101)      ** Filter MI101

TABLE V

| Neuron | INPUT02 | Tagname NI102 | Description Stock Flow to Bleach Plt |
|---|---|---|---|
| Units | GPM | Value 3216.0000 | Min 2000.0000   Max 5000.0000 |

Processing Instructions

```
IF FI102 > 600            ** If FI102 is greater than 600 GPM
   NI102 = FI102          **    use FI102 as input to neuron
ELSE                      ** Else . . .
   NI102 = NI102          **    use last value of NI104
ENDIF
```

TABLE VI

| Neuron | INPUT03 | Tagname NI103 | Description Stock Consistency |
|---|---|---|---|
| Units | % | Value 2.8780 | Min 1.5000   Max 4.5000 |

Processing Instructions

```
IF CI103A > 2.0 .AND. CI103A < 5.0    ** If CI103A is in range . . .
   CI103 = CI103A                     **    select CI103A
ELSE                                  ** Else . . .
   IF CI103B > 2.0 .AND. CI103B < 5.0 **    If CI103B is in range . . .
      CI103 = CI103B                  **       select CI103B
   ELSE                               **    Else . . .
      CI103 = CI103                   **       use last value of CI103
   ENDIF                              **
NI103 = CI103                         ** Set neuron value to CI103
&SAVE CI103                           ** Save current CI103 to history
```

TABLE VII

| Neuron | INPUT04 | Tagname NI104 | Description Injection Water Flow |
|---|---|---|---|
| Units | GPM | Value 540.0000 | Min 400.0000   Max 600.0000 |

Processing Instructions

```
IF FI104 < 580            ** If FI104 is less than 580 GPM . . .
   NI104 = FI104          **    use FI104 as input to neuron
ELSE                      ** Else . . .
   NI104 = NI104          **    use last value of NI104
ENDIF
```

TABLE VIII

| Neuron | INPUT05 | Tagname NI105 | Description C102 Total Flow |
|---|---|---|---|
| Units | GPM | Value 62.0000 | Min 30.0000   Max 175.0000 |

Processing Instructions

TABLE VIII-continued

| Neuron | INPUT05 | Tagname NI105 | Description C102 Total Flow |
|---|---|---|---|
| Units | GPM | Value 62.0000 | Min 30.0000    Max 175.0000 |

| | |
|---|---|
| SELECT &HISTORY FI105 | ** Select history file for FI105 |
| &BACK 20 | ** Move back by 20 1 minute samples |
| NI105 = HIST_VALUE | ** Use historical value for neural input |
| &SAVE FI105 | ** Save current value of FI105 in history |

Exemplary rules for output neurons are set forth in Tables IX-XI.

TABLE IX

| Neuron | OUTPUT01 | Tagname NO101 | Description Predicated Mat Consist. |
|---|---|---|---|
| Units | % | Value 13.2683 | Min 10.0000    Max 15.0000 |

Processing Instructions

| | |
|---|---|
| IF NO101 > 1.02 * CI114 THEN | ** If 2% above target . . . |
|   IF FI104 < 450 THEN | ** And FI104 less than 450 |
|     FI104SP = FI104SP + 0.10 * (NO101−CI114) | **   Adjust FI104 setpoint |
|   ELSE | ** Else . . . |
|     FI102SP = FI102SP − 0.05 * (NO101−CI114) | **   Adjust FI102 setpoint |
|   ENDIF | |
| ENDIF | |
| IF NO101 < 0.98 * CI114 THEN | ** If 2% below target . . . |
|   IF FI104 < 325 THEN | ** And FI104 less than 325 |
|     FI104SP = FI104SP + 0.10 * (NO101−CI114) | **   Adjust FI104 setpoint |
|   ELSE | ** Else . . . |
|     FI102SP = FI102SP − 0.05 * (NO101−CI114) | **   Adjust FI102 setpoint |
|   ENDIF | |
| ENDIF | |

TABLE X

| Neuron | OUTPUT02 | Tagname NO102 | Description Vat Consistency |
|---|---|---|---|
| Units | % | Value 1.4852 | Min 1.2000    Max 2.2000 |

Processing Instructions

CI113 = NO102

TABLE XI

| Neuron | OUTPUT03 | Tagname NO103 | Description Equivalent C12 Set Point |
|---|---|---|---|
| Units | % | Value 6.0000 | Min 0.0000    Max 10.0000 |

Processing Instructions

| | |
|---|---|
| MI117 = NO103 | ** Load % Applied Target |
| FI117SP = MI117 * (1.0 − FR117) * MI101 | ** Calc. CL2 setpoint |
| FI105SP = (MI117 * FR117 * MI101)/(1.5803 * DI105) | ** Calc. CL02 setpoint |

The I/O driver protocols are configured by defining the type of process control equipment to be interfaced with the address or tagname of the I/O points in the process control system and the communication parameters required. The process control equipment may be Programmable Logic Controllers (PLC), Distributed Control Systems (DCS) or individual analog controllers.

The training function allows the user to generate and train neural networks for his specific application. A new network is generated after the user completes the configuration process described above. Information from the NETDEF.DBF database is used to automatically build the files required by the NeuroShell program to define the neural network. The "Define Training Set" function allows the user to define the names of four training sets and the conditions required for adding training data to each set. The training data is evaluated for inclusion in a training set when actual operating data is provided to the neural network. If there is a significant error between the operating data and the predicted values, the neural input values associated with that prediction and the operating data are added to the appropriate training set.

The monitoring function allows the user to view process data and neural network outputs. In the dBASE IV embodiment, the browse function is used to view data in the point definition and network definition databases. The monitoring function would typically be implemented as an integral part of the process control system. The integration of this function into the process operator's interface is highly desirable and will be a standard feature of future embodiments.

Figure 3:
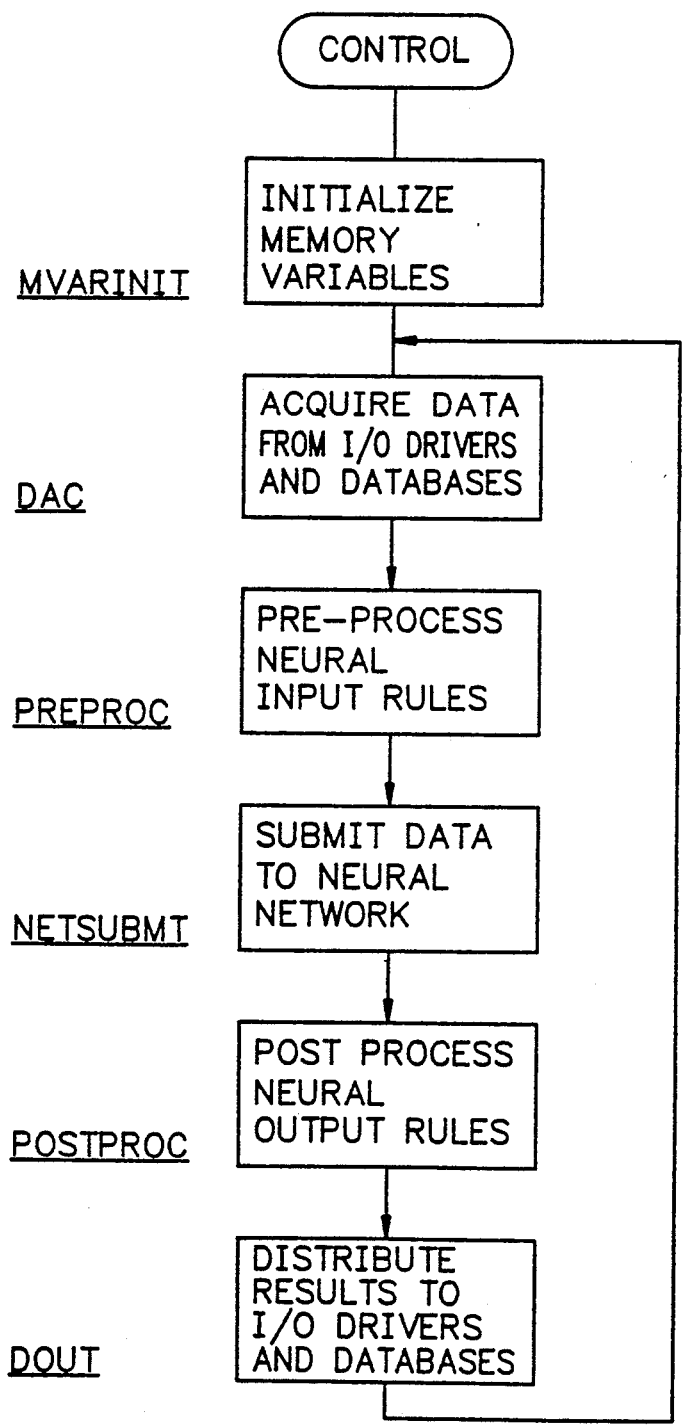
FIG. 3 is a flow chart of the control structure showing overall program segments.
Figure 4:
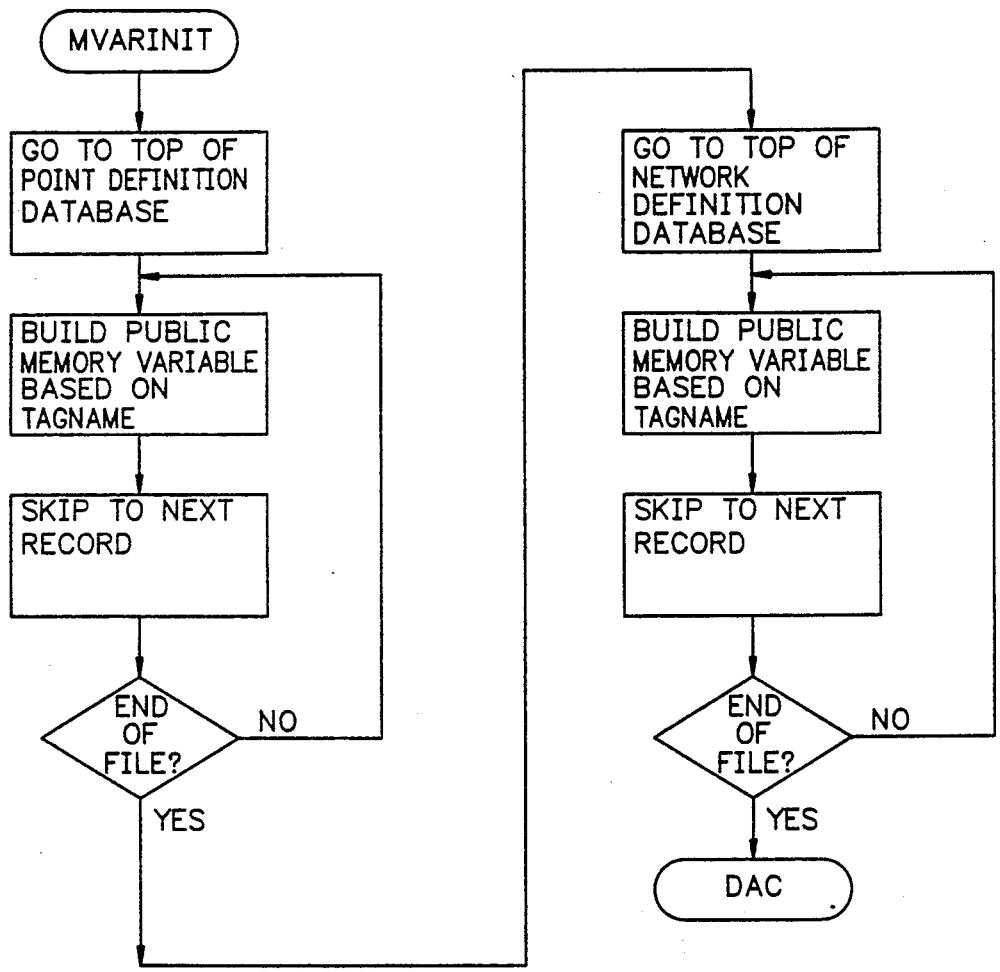
FIG. 4 is a flow chart of program segment MVARINIT.

The control function uses a previously trained neural network to implement real-time control of the process. This functionality is implemented in the dBASE IV embodiment by source code for a dBASE IV command file the program "CONTROL.PRG" The overall structure of CONTROL.PRG is shown in FIG. 3. The program is comprised of six program segments that are described as follows:

Referring to FIG. 4, MVARINIT.PRG is the variable initialization procedure for CONTROL.PRG. The primary function of MVARINIT is to define variable structures and initialize variable values. A public memory variable is defined for each point record in the point definition database and for each neuron record in the network definition database. These memory variables are used to hold the point values for the other procedures of CONTROL.PRG.

Figure 5:
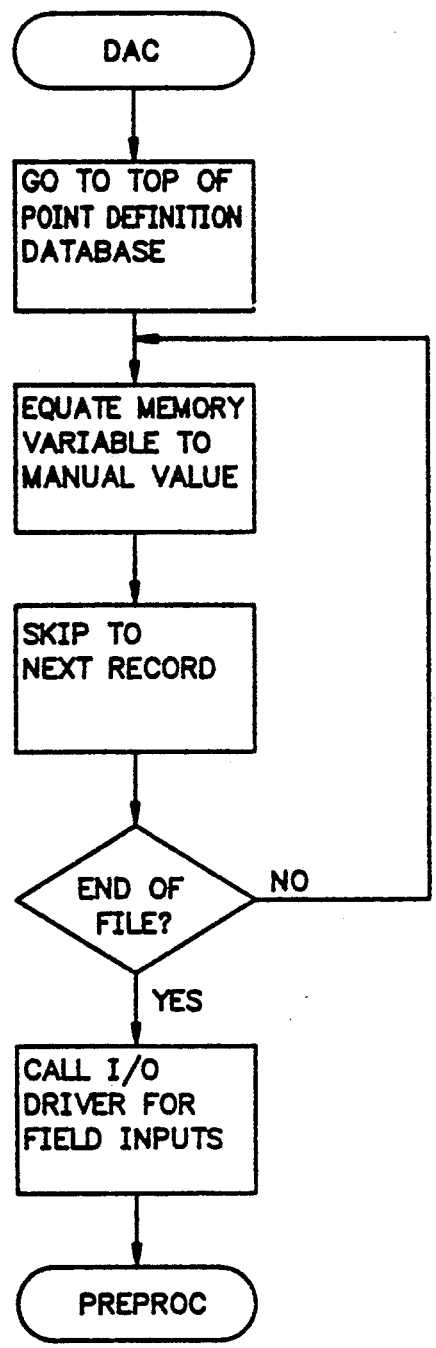
FIG. 5 is a flow chart of program segment DAC.

Referring to FIG. 5, DAC.PRG is the data acquisition procedure for CONTROL.PRG. The primary function of DAC is to acquire data from manual entry points in the point definition database and read field inputs by calling the appropriate I/O driver.

Figure 6:
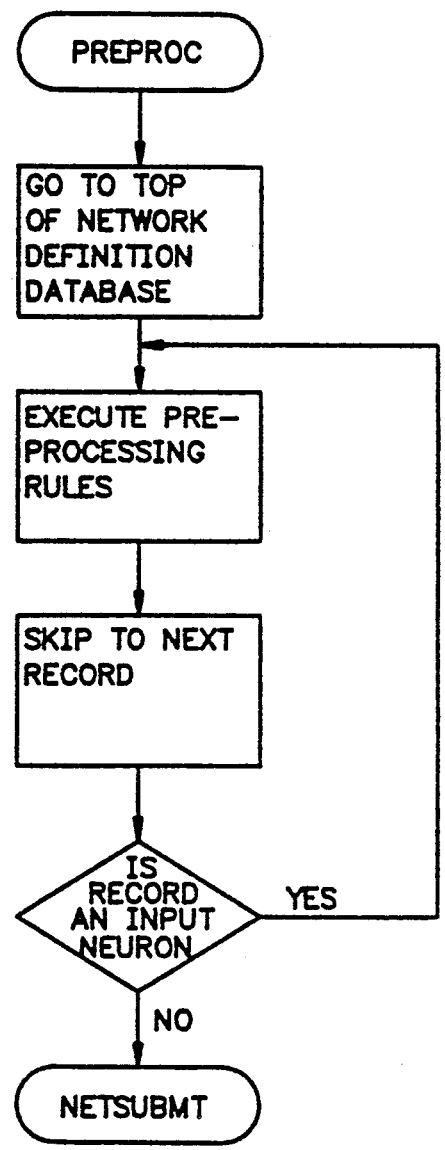
FIG. 6 is a flow chart of program segment PREPROC.

Referring to FIG. 6, PREPROC.PRG is the rule based neural input pre-processing procedure for CONTROL.PRG. The procedure executes the pre-processing rules for each input neuron configured in the network definition database. The rules can be any valid dBASE IV command.

Figure 7:
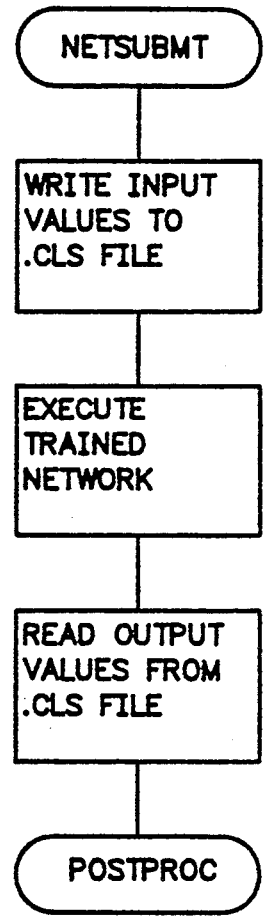
FIG. 7 is a flow chart of program segment NETSUBMT.

Referring to FIG. 7, NETSUBMT.PRG is the neural network interface procedure for CONTROL.PRG. The procedure builds the classification file required to submit data to a trained NeuroShell network. After building the file, NETSUBMT calls NeuroShell to execute the network. NeuroShell places the resulting neuron output values in the classification file and returns to NETSUBMT. NETSUBMT then reads the neural outputs from the classification file and moves the results to the output variables.

Figure 8:
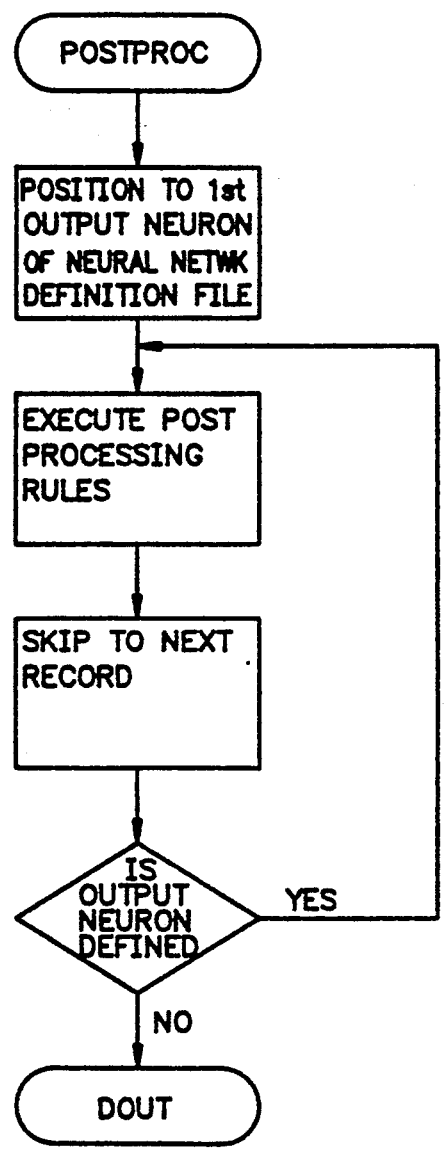
FIG. 8 is a flow chart of program segment POSTPROC.

Referring to FIG. 8, POSTPROC.PRG is the rule based neural output post-processing procedure for CONTROL.PRG. The procedure executes the post-processing rules for each output neuron configured in the network definition database. The rules can be any valid dBASE IV command.

Figure 9:
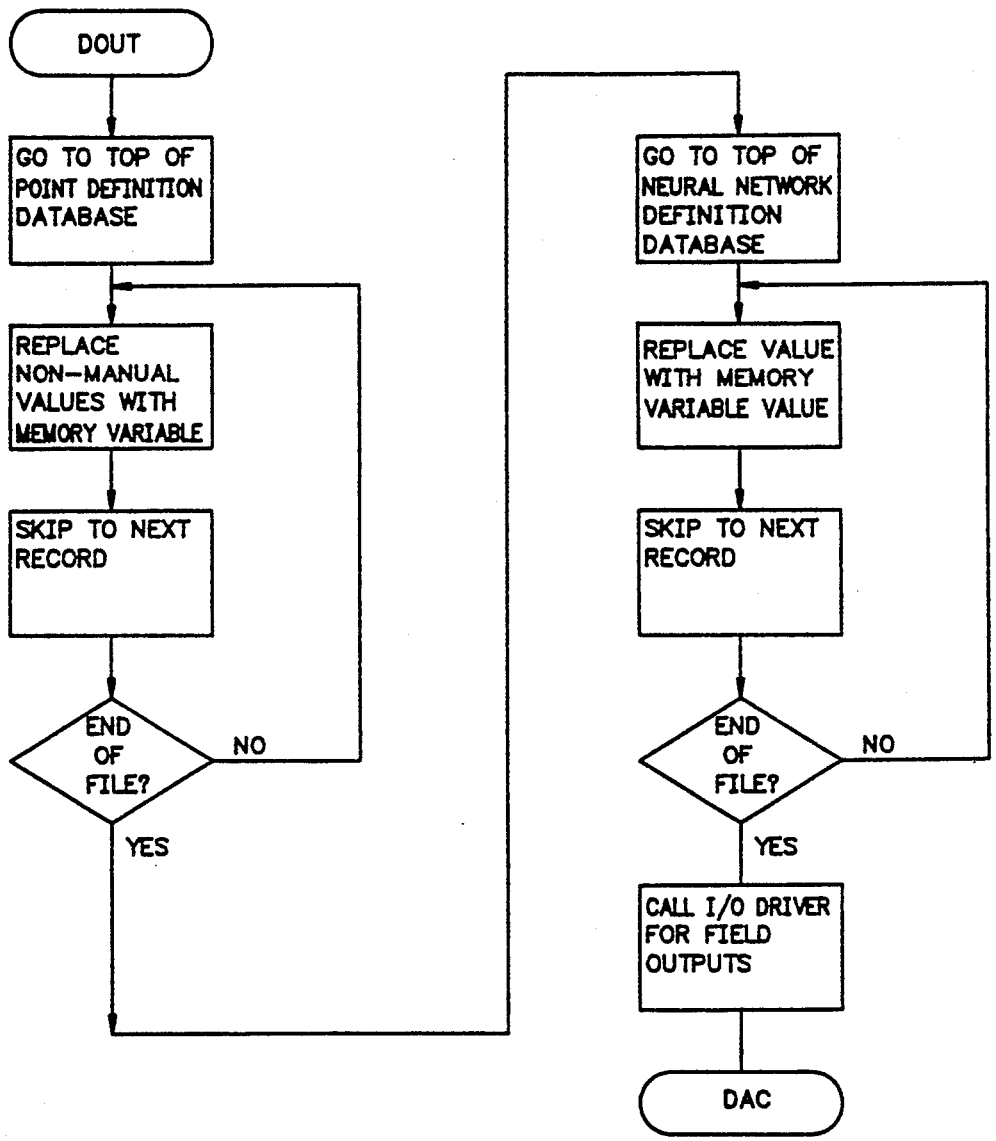
FIG. 9 is a flow chart of program segment DOUT.

Referring to FIG. 9, DOUT.PRG is the data distribution procedure for CONTROL.PRG. The primary function of DOUT is to write data to the network definition database and the point definition database and write field outputs by calling the appropriate I/O driver.

Figure 10:
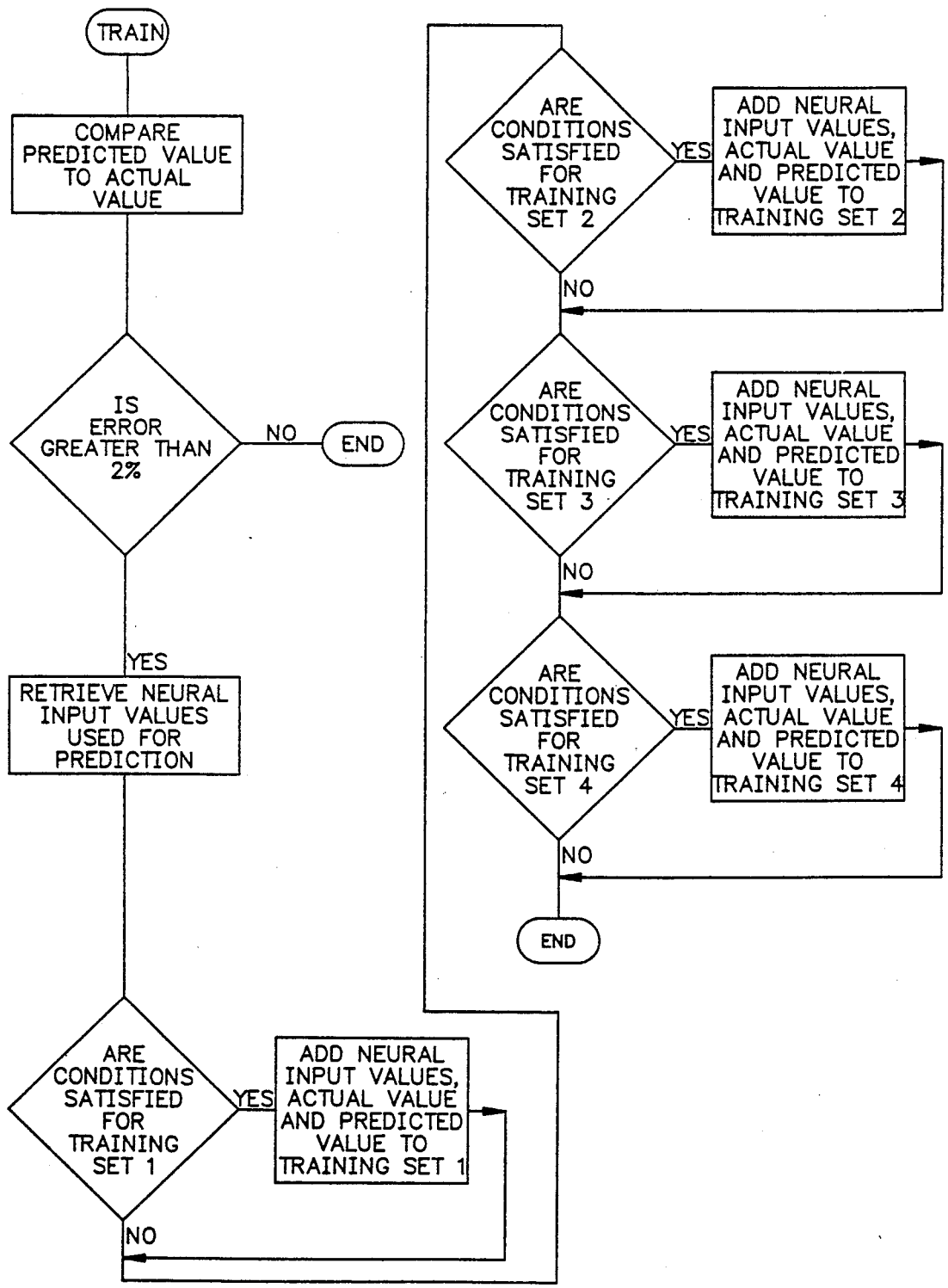
FIG. 10 is a flow chart of the training program.

Referring to FIG. 10, the TRAIN program is used to intelligently select data sets from the process data, in an on-line manner, and store the data in training sets to be used for training and updating networks. The predicted values (neural outputs) are compared to actual values. If the difference exceeds say 2%, then additional training sets are gathered to retrain the neural network. Each set of neural input values and actual values (a training set) is tested to determine if it is a valid training set. A training set may be invalid because of a short or open in a lead wire from an analog input or for other reasons that put an input value outside of a logical range.

Referring now to FIGS. 11 and 11A, there is shown in schematic form a continuous process used in the paper-making industry controlled by a neural network according to the teachings of this invention. Shown is the initial portion of a bleach line. It should be understood that this is exemplary of the processes which may be controlled by a neural network according to this invention. This invention can be applied to numerous other processes. The process variable inputs to the controller are labeled with letters and the process target value outputs from the controller are labeled with numerals. The tagnames for process variables appear in circles, squares and hexagons. The properties or process parameters that correspond to the tagnames are set forth in Table I.

The main objective of the bleaching process is to increase the brightness (whiteness) of a pulp by the removal and modification of certain constituents of the unbleached pulp. The process involves using chemicals to oxidize and/or replace the major color component (lignin) in the pulp suspension. The measure of lignin content in the finally processed pulp is known as the Kappa-number (CEK). This measure is taken after the stock suspension passes through two process stages (the chlorination or C-Stage and the extraction or E/0-Stage). The measured CEK (BI115B) cannot be directly controlled. An optical sensor (BI115) is used to measure the change in color (brightness) at an early stage of the process. The chemical reaction which bleaches the pulp takes 90 to 120 minutes to go to completion. The brightness sensor being located approximately $1\frac{1}{2}$ to 2 minutes into the reaction measures a variable the value of which is used by the neural net along with many other variable values to generate a projection of the final brightness. Because this projection is only a indirect measurement of the desired value, the projection is affected by variables such as temperature, stock consistency, flow rate, chemical concentration and so forth.

The chemical reaction is a two-part reaction consisting of oxidation and substitution. A portion of the chlorinated lignin is water soluble and is washed out of the pulp. However, a portion is not water soluble and must be modified to be removed. This takes place approximately one-third to one-half the way through the chlorination reaction. Based upon the amount of chlorine added, the proportionate amount of caustic (NaOH) is added to render the final chlorinated lignin water soluble. In some instances, other chemicals are also added to enhance the brightening process at different points or stages in the process. Some examples of these chemicals are oxygen, peroxide and hypochlorite. The location of the addition point, the amount of auxiliary chemical added along with other conditions about the addition point have an effect on the final CEK number. Interrelationships of the many variables are difficult to determine and in some cases are unknown. The process time constant (90 to 120 minutes) is long compared to the time to adjust the controlled variables (1 to 120 seconds).

Referring still to FIGS. 11 and 11A, the process variable inputs (A . . . KK) are measured by various transducers and applied to the controller (shown as circles). Manual entries of process variables are also applied to the controller (shown as squares). Finally, calculated variables are applied to the controller (shown as hexagons). The variable which the process seeks to control (CEK) is determined in the laboratory based on samples taken at the output of the E/O washer Stage.

The outputs from the controller (1 . . . 8) are applied to provide the operator a read-out or to make corrections to the system. Output 1 is used along with the C-Stage brightness measurement BI115 to calculate a compensated CEK number which is predictive of the CEK lab entry value (BI115B). The purpose of the control system is to adjust controlled process variables so that the predicted and tested CEK values approach a desired value. (If the predicted and measured CEK values are written out reasonably close then the neural net has not been adequately trained or requires retraining.)

Output 1 adjusts the set points for two PID controllers in a first stage of the process wherein $Cl_2$ and $ClO_2$ are added to the raw pulp. Output 3 adjusts the set point of a PID controller for the addition of caustic (NaOH) to the washer following the C-Stage. Output 4 adjusts the set point of a PID controller for addition of $O_2$ to the E/O-Stage. If the predicted CEK (predicted by brightness measure BI115 and the other variable values applied to the neural net) is not at the desired level, controlled variables just mentioned can be adjusted to move the predicted value to the desired value.

The above-described system provides the following features and functions: A mechanism to present input data to the neural network which data is derived from a variety of sources including: a) analog and discrete inputs which are closely coupled to the neural network by direct I/O allowing the input of actual process signals with and without signal conditioning; and b) interrogation of information from process control systems and host computers which require some sort of intelligent communication protocol. A method to process input and output signals including: a) pre-processing or input processing which includes such features as averaging, filtering, combining and signal switching of signals prior to presentation to the neural network; b) the output or post-processing of neural network outputs including the application of rule-based knowledge in addition to limit checks, comparisons, weighting, scaling and ratioing. A system for final control including: a) a mechanism for processing the outputs residing on the same system where the inputs were received or; b) a system in which inputs may be received from one or multiple systems and outputs may be sent to other systems or to a host system for data logging and archiving.

Having thus described our invention with the detail and particularity required by the Patent Laws, what is claimed and desired to be protected by Letters Patent is set forth in the following claims.

We claim:

1. A control system for a continuous physical process characterized by directly controlled process variables and indirectly controlled process variables, said variables having current values and having had historical values that define the state of the physical process wherein the current values of directly controlled process variables are measured and wherein the current value of at least one indirectly controlled process variable is controlled indirectly by control of the current values of a plurality of directly controlled process variables comprising:

control means responsive to set point values for establishing the current values of the directly controlled process variables at said set point values applied to said control means, means for implementing a trainable neural network having a plurality of input neurons for having input values applied thereto and at least one output neuron for providing an output value, means for training the neural network to provide a predicted value for the at least one indirectly controlled process variable at an output neuron, said predicted value corresponding to the input values of the neural network, means for measuring the values of directly controlled process variables, means for establishing and continuously updating a computer database to store the current and historical values of measured process variables, computer means for establishing the input values at the input neurons of the neural network based upon the values of process variables stored in the computer database, computer means for establishing set point values to be applied to control means based upon values at an output neuron, said control system so constructed and arranged that said computer means for establishing set point values, after the neural network has been trained to predict the value of the at least one indirectly controlled process variable, changes at least one set point value to cause the predicted value of the at least one indirectly controlled process variable to approach a desired value.

2. The control system according to claim 1 wherein the continuous physical process is characterized by an input stage, intermediate stages and an output stage, said process takes a material or workpieces at said input stage, processes said material or workpieces at the intermediate stages and delivers the material or workpieces at said output stage and wherein a period of time between the material or a workpiece being at the input stage and the material or workpiece being at the output stage is long compared to a period of time for the control means to establish directly controlled variables at set points.

3. The control system according to claim 2 wherein the indirectly controlled variable is measured at or near the output stage and other process variables are measured at or near all stages.

4. The control system according to claim 3 wherein control means are associated with a plurality of distinct process stages.

5. The control system according to claims 1, 2, 3 or 4 wherein said means for establishing and continuously updating the computer data base stores values of a plurality of measured variables at spaced time intervals in a data structure to maintain a process history.

6. The control system according to claim 5 wherein the set point values applied to each of the control means at a given process stage are established for those control means by presenting to the neural network inputs based upon the historical values of the measured process variables associated with prior process stages and based upon the current values of measured process variables at succeeding stages.

7. The control system according to claim 6 wherein the set point values of each control means are adjusted at spaced time intervals.

8. The control system according to claim 1, 2, 3 or 4 wherein the computer means for establishing set point values establishes new set point values during spaced adjustment time intervals and wherein the means responsive to set point values for establishing the values of the directly controlled variables bring the values of the respective controlled variables to set point values during settling time intervals, and wherein the means for establishing and continuously updating the computer database comprises means for storing values of measured variables in the database in a data structure immediately following the settling time intervals and before the next spaced adjustment time interval.

9. A control system for a process characterized by directly controlled process variables and indirectly controlled variables, all said process variables having values that define the state of the process wherein the values of a plurality of process variables are measured and wherein the value of at least one process variable is controlled indirectly by control of a plurality of directly controlled process variables comprising:

control means for establishing the value of the directly controlled variables at set point values applied to said control means, means for implementing a neural network having a plurality of input neurons for having input values applied thereto and at least one output neuron for providing an output value, computer means for storing an input value for input neurons of the neural network and at least one computer executable rule to establish the input value associated with an input neuron, computer means for storing an output value for output neurons of the neural network and at least one computer executable rule for an output neuron, computer means for establishing a process database defining the state of the process including the instantaneous values of the process variables, means for continuously updating the process database to reflect the values of the measured process variables, computer means for executing a rule associated with an input neuron to establish the value of the input neuron, computer means for executing a rule associated with an output neuron for establishing set point values to be applied to control means, means for applying the set point values to the control means, means for training the neural network to generate a predicted value corresponding to the value of said indirectly controlled variable at an output neuron from values at input neurons corresponding to measured process variables, said control system so constructed and arranged that after the neural network has been trained to generate the predicted value of said indirectly controlled variable a rule associated with said at least one output neuron changes at least one set point value to cause the predicted value of the indirectly controlled variable to approach a directed value.

10. The control system according to claim 9 wherein the control means include devices with feedback control that compare the values of the directly controlled variables with the set point values and generate error signals applied to the devices having a sign to drive the devices to diminish the error signals.

11. The control system according to claim 10 wherein the feedback control comprises proportional-integral-differential control.

12. The control system according to claim 9 wherein the means for implementing the neutral network is an integrated circuit defining the neural network and a teaching algorithm.

13. The control system according to claim 9 wherein the means for implementing the neural network is a computer program defining the neural network and a teaching algorithm.

14. The control system according to claim 9 wherein the computer means for storing the values and rule associated with an input neuron is a second computer database.

15. The control system according to claim 9 wherein the computer means for storing the values and rule associated with an output neuron is a second computer database.

16. The control system according to claim 9 wherein the means for continuously updating the process database to reflect the values of the directly controlled variables comprise computer input ports and a computer task for polling the computer input ports or fielding interrupts from the computer input ports to transfer data from the ports to the process database.

17. The control system according to claim 9 wherein the means for applying set point values to the control means comprise computer output ports and a computer task for transferring set point values to the computer output ports.

18. The control system according to claim 9 wherein the computer means for executing said computer executable rule associated with an input neuron and said computer executable rule associated with an output neuron comprise a computer evaluator task which loads said computer executable rules and loads values, if any, required to evaluate said computer executable rules from the process database and/or the input neurons and/or the output neurons and evaluates the rules one at a time.

19. The control system according to claim 9 further comprising means for storing values of measured process variables at spaced time intervals to maintain a process history.

20. The control system according to claim 19 wherein the process history is part of the process database.

21. The control system according to claim 19 wherein the rule associated with an input neuron for establishing the value of the input neuron takes as a parameter a value from the process history.

22. The control system according to claim 9 in which rules associated with input neurons comprise transfer, averaging, filtering, combining and/or switching rules.

23. The control system according to claim 9 in which rules associated with at least one output neuron comprise limit checking, weighing, scaling and/or ratioing rules.

24. The control system according to claim 9 in which rules associated with at least one output neuron comprise rules for selecting which set point should be modified in order to move the predicted value of the indirectly controlled variable to the desired value of the indirectly controlled variable.

25. The control system according to claim 9 further comprising means for storing values of measured process variables in a first-in-first-out buffer immediately following time spaced settling periods in which the rule associated with an input neuron and at least one output neuron are continuously updated to move the predicted value of the independently controlled variable to the desired value of the independently controlled variable so that a process history is maintained by the first-in-first-out buffer.

26. The control system according to claim 25, wherein a rule associated with at least one input neuron to establish the value of the input neuron takes as a parameter a value from the process history.

27. The control system according to claim 9 wherein an actual value of the indirectly controlled process variable cannot be determined until some period after it has been predicted.

28. The control system according to claim 9 wherein the means for training the neural network to generate a predicted value at an output neuron from the values at input neurons corresponding to directly controlled variables comprises a computer task for applying a plurality of training sets of input neuron and output neuron values captured from the process while it is in operation to the neural network during a training period.

29. The control system according to claim 28 wherein at least one input neuron value and at least one measured output neuron value are collected at different times.

30. The control system according to claim 9 wherein the value of the indirectly controlled variable is only determinable at a later time downstream from the control means which control directly controlled variables.

31. The control system according to claim 30 wherein the means for training the trainable neural network to generate a predicted value corresponding to the value of an indirectly controlled variable at an output neuron from the values at input neurons corresponding to measured process variables comprises a computer task for applying a plurality of training sets of input neuron values and output neuron values captured while the process is in operation to the input parts of the neural network during a training period said input neuron values and output neuron values being captured at different times.

* * * * *